United States Patent [19]
Ball

[11] Patent Number: 5,915,052
[45] Date of Patent: Jun. 22, 1999

[54] LOOP STATUS MONITOR FOR DETERMINING THE AMPLITUDE OF THE SIGNAL COMPONENTS OF A MULTI-WAVELENGTH OPTICAL BEAM

[75] Inventor: Gary A. Ball, Simsbury, Conn.

[73] Assignee: Uniphase Telecommunications Products, Inc., Bloomfield, Conn.

[21] Appl. No.: 08/885,427

[22] Filed: Jun. 30, 1997

[51] Int. Cl.⁶ .................................................. G02B 6/28
[52] U.S. Cl. ........................................... 385/24; 359/130
[58] Field of Search .................................... 359/124, 127, 359/130, 134; 385/24, 37

[56] References Cited

U.S. PATENT DOCUMENTS

| | | | |
|---|---|---|---|
| 4,284,663 | 8/1981 | Carruthers et al. | 264/1.24 |
| 4,953,939 | 9/1990 | Epworth et al. | 359/173 |
| 4,984,861 | 1/1991 | Suchoski, Jr. et al. | 385/2 |
| 5,026,137 | 6/1991 | Tokumitsu | 385/24 |
| 5,042,898 | 8/1991 | Morey et al. | 385/37 |
| 5,077,816 | 12/1991 | Glomb et al. | 385/37 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,134,620 | 7/1992 | Huber | 372/6 |
| 5,140,456 | 8/1992 | Huber | 359/341 |
| 5,148,503 | 9/1992 | Skeie | 385/3 |
| 5,151,908 | 9/1992 | Huber | 372/6 |
| 5,153,762 | 10/1992 | Huber | 359/125 |
| 5,159,601 | 10/1992 | Huber | 372/6 |
| 5,166,821 | 11/1992 | Huber | 359/328 |
| 5,168,534 | 12/1992 | McBrien et al. | 385/3 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber et al. | 359/132 |
| 5,210,633 | 5/1993 | Trisno | 359/194 |
| 5,222,089 | 6/1993 | Huber | 372/26 |
| 5,231,529 | 7/1993 | Kaede | 359/124 |
| 5,243,609 | 9/1993 | Huber | 252/1 |
| 5,257,124 | 10/1993 | Glaab et al. | 359/124 |
| 5,257,125 | 10/1993 | Maeda | 359/196 |
| 5,260,823 | 11/1993 | Payne et al. | 359/341 |
| 5,268,910 | 12/1993 | Huber | 372/6 |
| 5,271,024 | 12/1993 | Huber | 372/6 |
| 5,283,686 | 2/1994 | Huber | 359/337 |
| 5,504,609 | 4/1996 | Alexander et al. | 359/125 |
| 5,579,143 | 11/1996 | Huber | 359/130 |
| 5,589,969 | 12/1996 | Taga et al. | 359/124 |
| 5,608,825 | 3/1997 | Ip | 385/24 |
| 5,617,234 | 4/1997 | Koga et al. | 359/131 |
| 5,627,848 | 5/1997 | Fermann et al. | 372/18 |
| 5,633,748 | 5/1997 | Perez et al. | 359/325 |
| 5,636,301 | 6/1997 | O'Sullivan et al. | 385/24 |
| 5,638,473 | 6/1997 | Byron | 385/37 |
| 5,696,615 | 12/1997 | Alexander | 359/134 |
| 5,715,076 | 2/1998 | Alexander et al. | 359/130 |

FOREIGN PATENT DOCUMENTS 2 295 247   11/1996   United Kingdom .

OTHER PUBLICATIONS

"Photoinduced Bragg Gratings In Optical Fibers" by William W. Mopey, Gary A. Ball and Gerald Meltz, Optics & Photonics News, Feb. 1994, 7 sheets.

Catalog of Integrated Optical Circuits, Uniphase Telecommunications Products, Electro–Optics Products Division, 1997.

"Piriodical" A Publication Of Photonic Integration Research, Inc., No. 12, Feb. 1997.

Literature regarding "AOTFS route traffic in WDM networks", Lightwave, Jun. 1996.

*Primary Examiner*—Hung N. Ngo
*Attorney, Agent, or Firm*—McCormick, Paulding & Huber

[57] ABSTRACT

A loop status monitor for determining the magnitude of the power output of each signal component of a multi-wavelength optical beam includes a dense wavelength division demultiplexing arrayed waveguide and a detector array. The detector elements are butt-coupled to each respective output of the waveguide to reduce insertion loss and cost. The detector array is formed of planar silica material having a plurality of precision ion implanted regions that separate the optical beam into its respective signal components. The signal components are directed to a corresponding detector element of the detector array. Each detector element includes a photodiode that converts the optical beam to an electrical signal indicative of the amplitude of the power of the channel.

11 Claims, 6 Drawing Sheets

Floride

FIG. 4

Silica

LOOP STATUS MONITOR FOR DETERMINING THE AMPLITUDE OF THE SIGNAL COMPONENTS OF A MULTI-WAVELENGTH OPTICAL BEAM

FIELD OF THE INVENTION

This invention relates to optical monitoring devices, and more particularly to a loop status monitor for demultiplexing a multi-wavelength optical beam into a plurality of component signals and determining the amplitude of the power of each component signal.

CROSS REFERENCE TO RELATED APPLICATIONS

Some of the matter contained herein is disclosed and claimed in the commonly owned U.S. patent application Ser. No. 08/885,428, entitled "Process For Fabrication And Independent Tuning Of Multiple Integrated Optical Directional Couplers On A Single Substrate" (Attorney Docket No. 4827-09); U.S. patent application Ser. No. 08/885,449, entitled "Method and Apparatus For Dynamically Equalizing Gain In An Optical Network" (Attorney Docket No. 4827-11) and U.S. patent application Ser. No. 08/884,747, entitled "Dynamic Optical Amplifier" (Attorney Docket No. 4827-14) all of which are incorporated herein by reference.

BACKGROUND OF THE INVENTION

Wavelength division multiplexing (WDM) of optical beams is presently being used to increase the rate of transmission of information through an optical fiber. These multi-wavelength optical beams provide information by a plurality of signal components, also referred to as optical channels. Each channel is defined by a unique wavelength of light that are multiplexed together and transmitted through a communication link of an optical network. In order to detect any problems or potential problems of the optical network and to provide feedback to active components within the network, a plurality of status monitors may be located throughout the network to provide information indicative of the health or condition of the optical beams transiting through the network. This information includes the amplitude and signal to noise ratio of each of the channels of the optical beams.

Figure 1:
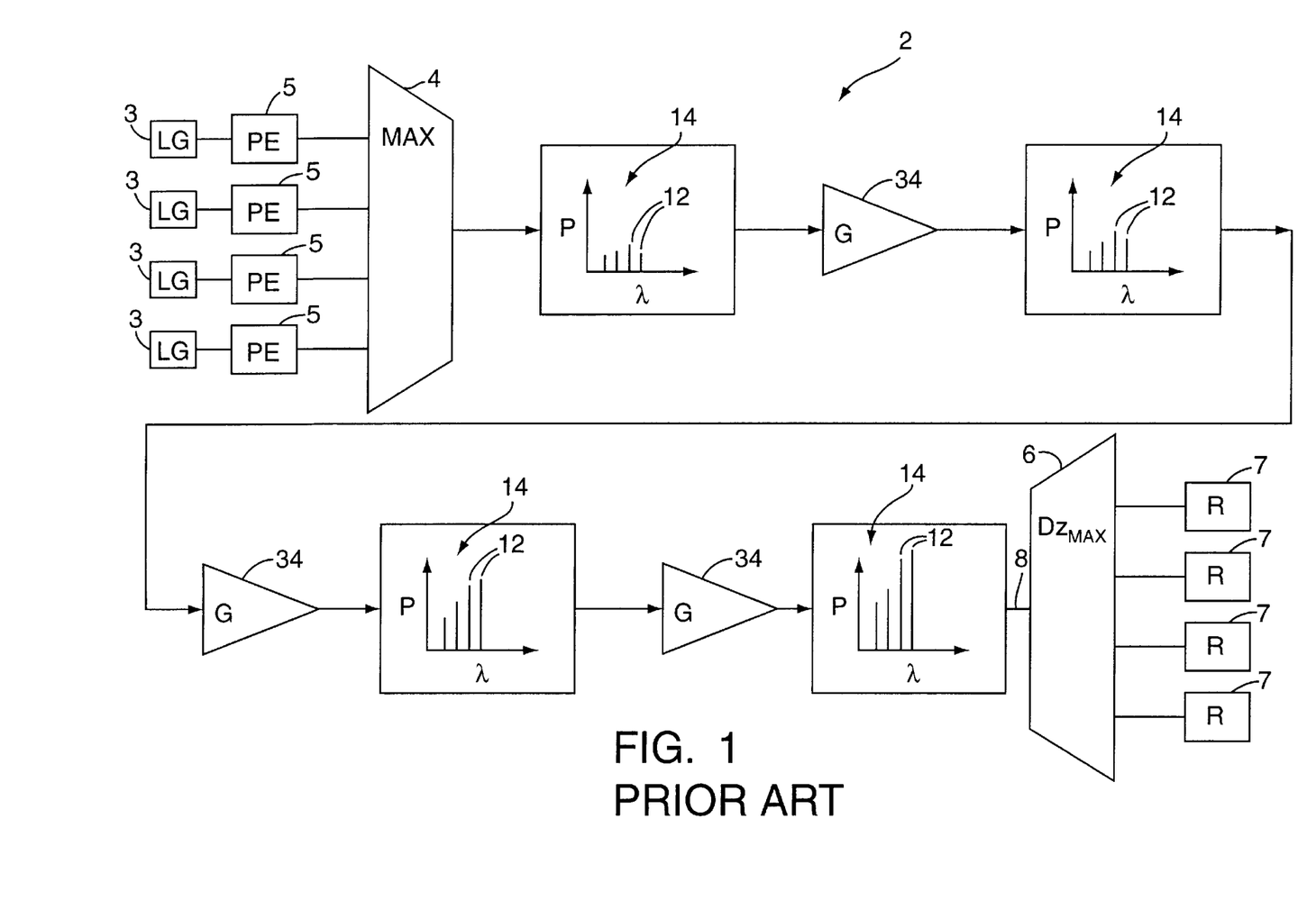
FIG. 1 is a graphical representation of a prior art communication link of an optical network.

The status monitor also may be used to compensate for gain variations throughout the optical network. Current wavelength division multiplexed (WDM) intercity communications links, as shown in FIG. 1, require a number of amplifiers along the link length to compensate for fiber loss. The intercity links can run approximately 600 meters. There is currently a need for an amplifier every 80 to 120 kilometers in these links.

Dynamic operating conditions, such as the addition and subtraction of the channels, and nonuniform gain characteristics of the amplifiers result in gain variations between the channels each time the optical beam is amplified. The prior art of FIG. 1 does not provide compensation for these conditions.

FIG. 1 shows a graphical representation of a typical communication link 2 of an optical network. A plurality of light generators (LG) 3 provide respective component signals 12 of select wavelengths that are combined by a multiplexer 4 to produce the multi-wavelength optical beam 14. Before the component signals are multiplexed, a plurality of pre-emphasis devices (PE) 5 amplify selectively each of the respective component signals 12. As mention hereinbefore, a plurality of amplifiers 20 amplify the optical beam 14 to compensate for fiber loss as the beam passes therethrough. At the receiver end of the communication link, the signal components 12 of the optical beam are then separated by a demultiplexer 6 and provided to a corresponding receiver (R) 7.

The prior art 2 does not provide any compensation to overcome the nonuniform gain of the each amplifier 20. As shown in each of the plots 14, which are representative of the amplitude of the output power of each channel 12, the differential of the output power of each of the channels increase after each gain stage 20. The output power of each channel of the communication link at 8, therefore, are not equal. The only compensation provided by the prior art is adjustment of the pre-emphasis devices 5 for amplifying each channel 12 to ensure adequate signal level and signal-to-noise is achieved.

A device that provides feedback of the channels is a Fabry-Perot spectrum analyzer. This spectrum analyzer includes two pieces of an optical fiber that are coated to become a broadband high reflector and are laterally-spaced and aligned with each other. The distance between the ends of the fibers are varied to determined the power spectrum of each optical signal. The spectrum analyzer and associated electronic control is very costly. These devices are bulky and unreliable due to its moving parts. In addition, calibration of these devices are difficult to maintain due to drift and hysterisis. These spectrum analyzers also do not provide simultaneous monitoring of each channel, but scans through each channel of the multi-wavelength optical beam to provide a serial output.

Accordingly, it is the principal object of this invention to provide an inexpensive, compact status monitor that provides signals indicative of the condition of each channel of an optical beam.

It is another object of this invention to provide a status monitor that does not require calibration which permits the status monitor to be interchangeable throughout the optical network.

It is a further object of this invention to provide a status monitor that generates simultaneously output signals of each channel that are indicative of the condition of each signal.

SUMMARY OF THE INVENTION

According to a preferred embodiment of the present invention, a loop status monitor is used in an optical network having a multi-wavelength optical beam with a plurality of component signals in which each component signal has an amplitude and an unique wavelength. The loop status monitor includes an optical waveguide for receiving and substantially simultaneously demultiplexing the multi-wavelength optical beam into a plurality of component signal beams. The loop status monitor also includes a detector array having a plurality of photodetectors for receiving said component signal beams. The detector array also provides substantially simultaneously a corresponding electrical feedback signal for each of the component signals indicative of the magnitude of the output power of the component signal.

According to another embodiment of the present invention, a loop status monitor is used in an optical network having a multi-wavelength optical beam with a plurality of component signals in which each component signal has an amplitude and a unique wavelength. The loop status monitor includes an optical waveguide for receiving and substantially simultaneously demultiplexing the multi-wavelength optical beam into a plurality of component signal beams.

The loop status monitor also includes a detector array having a plurality of photodetectors for receiving said component signal beams. The detector array also provides substantially simultaneously a corresponding electrical feedback signal for each of the component signals indicative of the magnitude of the output power of the component signal. The loop status monitor further includes a controller for receiving the corresponding electrical feedback signal for each of the component signals and generating a corresponding control signal for each of the component signals. The control signals are provided to a gain equalization module to remove the differences between the amplitudes of the output power of each of the component signals.

According to another embodiment of the present invention, a method for use of generating a control signal for each component signal of a multi-wavelength optical beam of the amount of attenuation required for equalizing each component signal includes a step of demultiplexing the multi-wavelength optical beam into the corresponding plurality of component signals. The magnitude of the power of each of the component signals is then determined. The magnitude of the power of the component signals are compared; and a control signal. A control signal for presentation to a gain equalization module to remove differences between the amplitudes of the output power of each of the component signals is then generated.

The above and other objects and advantages of this invention will become more readily apparent when the following description is read in conjunction with the accompanying drawings.

DETAILED DESCRIPTION OF THE PREFERRED EMBODIMENT

Figure 2:
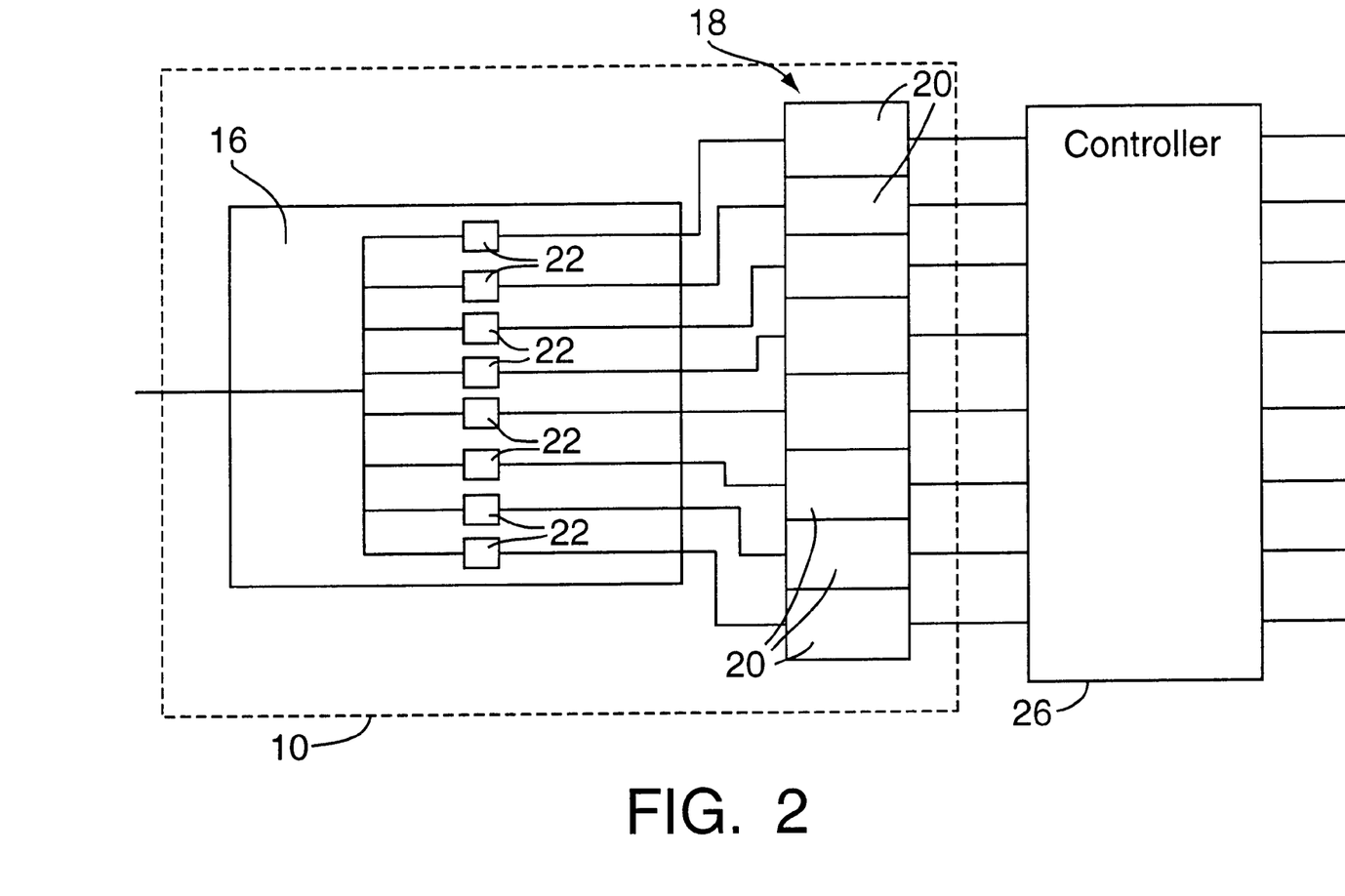
FIG. 2 is a block diagram representative of the loop status monitor of FIG. 1.

Referring to FIG. 2, a block diagram of a preferred embodiment of a loop status monitor 10 for determining the condition of each channel 12 of a wavelength division multiplexed optical beam 14. The loop status monitor 10 includes a dense wavelength division demultiplexing arrayed waveguide 16 and a detector array 18 for separating the optical beam into its respective channel and determining at least the amplitude of each channel. The detector array 18 may also provide signals indicative of the condition of the channels, such as the signal to noise ratio. The loop status monitor serves the function of a low cost optical spectrum analyzer.

The planar array waveguides 16 are currently made using silica on silicon technology. These are silica on silicon waveguides and are commercially available for multiplexing/demultiplexing in WDM networks. The planar waveguide includes a plurality of precision ion implanted regions for separating each channel 12 of the optical beam that direct the channels to a corresponding detector element 20 of the detector array 18. Each detector element 20 includes a photodiode that converts the optical beam to an electrical signal indicative of the amplitude of the power of the channel. In an alternative for the waveguide, any passive multiplexing/demultiplexing dielectric filter based device or Fiber Bragg Grating based device could be used with appropriate modifications.

WDM 1×N arrayed demultiplexer waveguides are presently commercially available. These commercial waveguides include multiple fiber pigtail outputs that result in relatively high excess losses (approximately 7 dB). In contrast, the waveguide 16 embodied in the present invention is butt-coupled to each of the elements 20 of the detector array 18, and thus eliminates the output pigtails and reduces the associated insertion loss.

One benefit of the loop status monitor 10 is that it provides greater than 15 dB of channel isolation without additional filtering. If, however, there is too much cross-talk between the channels, Bragg gratings 22 may be written directly into the silica of the waveguide to increase the channel isolation and enhance the resolution in the monitor 10. Increased channel isolation also permits blocking of the WDM signals by tuning the grating, such as by heating the gratings, which permits detection of the amplifier noise level. This information will allow the signal-to-noise ratio to be computed.

Figure 3:
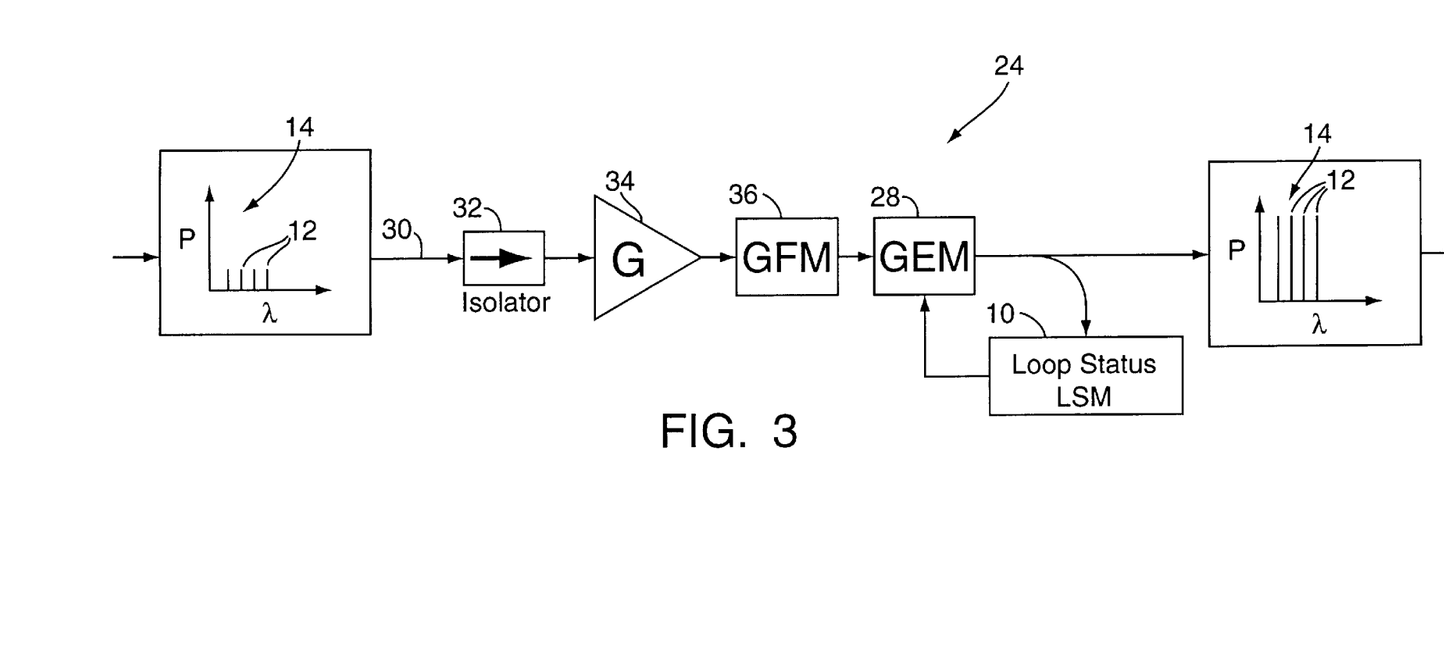
FIG. 3 is a diagrammatic block diagram of an optical amplifier of the type embodying the present invention.

For use in a dynamic optical amplifier 24 as shown in FIG. 3, the output signals of each detector element 20 are provided to a controller 26. In response to these output signals, the controller 26 generates corresponding control signals representative of the degree of attenuation required to equalize the output signal of each channel of the amplifier 24. Each respective control signal, therefore, is indicative of the difference of the amplitude of the respective channel 12 and the channel having the least amplitude. The control signals are provided to a gain equalization module 28 that will be described in greater detail hereinafter.

Figure 7:
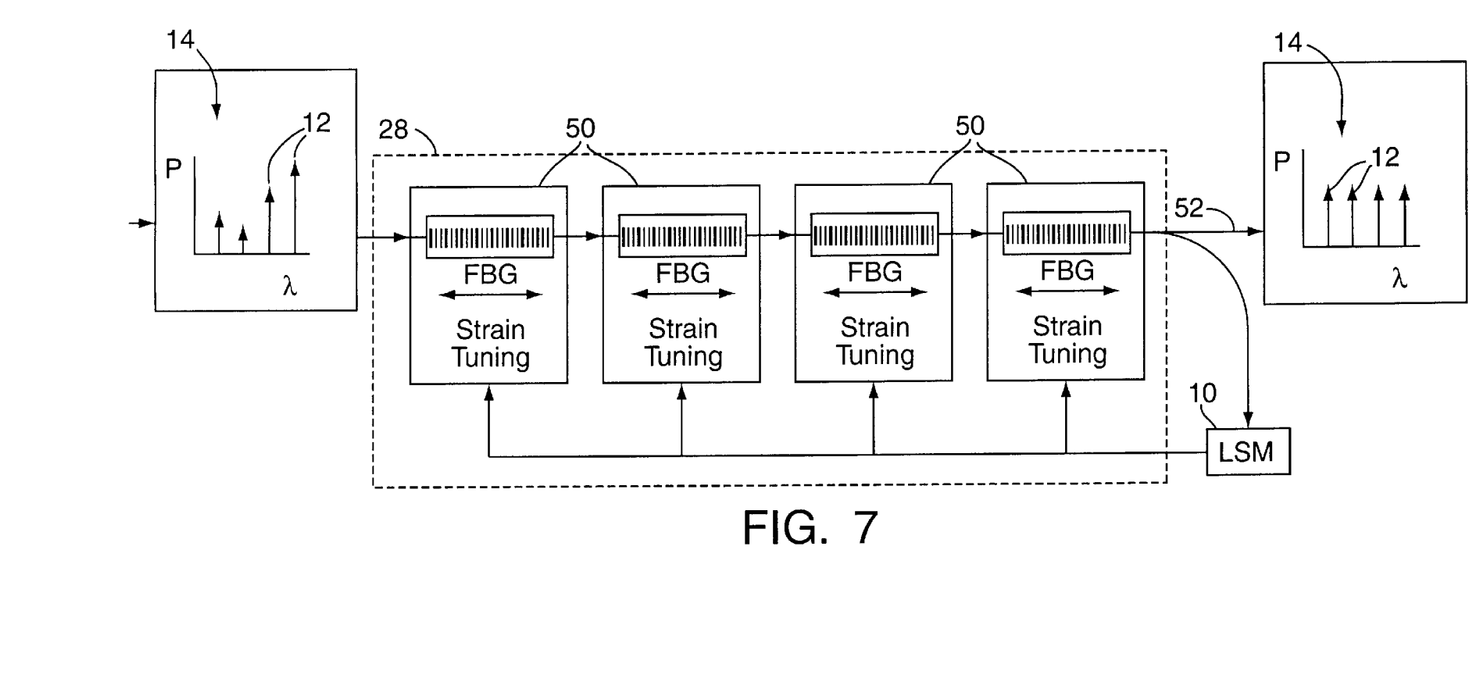
FIG. 7 is a block diagram representative of the dynamic gain equalization module of FIG. 2.
Figure 8:
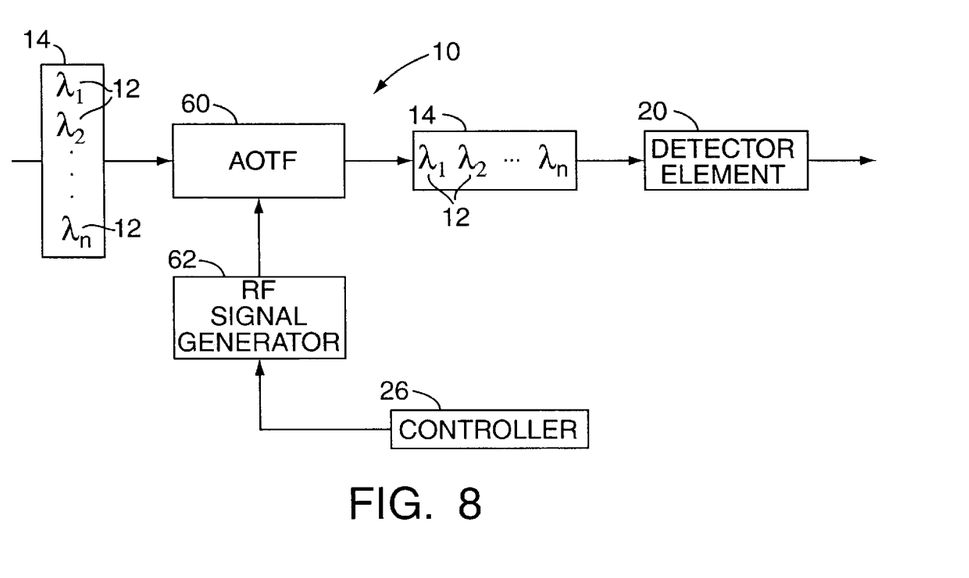
FIG. 8 is a diagrammatic block diagram of an alternative embodiment of a loop status monitor of the type embodying the present invention.

In an alternative embodiment shown in FIG. 8, an AOTF 60, configured as a spectrum analyzer, along with appropriate control and feedback electronics can be used as a loop status monitor 10. In this embodiment, the AOTF scans through each network channel 12 of the multi-wavelength optical beam 14, sequentially, monitoring the power in each channel. The selection of wavelengths can be changed in approximately 10 microseconds making the spectrum analyzer reconfiguration virtually instantaneous. From this data a channel intensity profile can be constructed and fed to appropriate network elements including the gain equalization module 28 (see FIG. 7), programmable add-drop modules and network health monitoring systems.

The control and feedback electronics for the AOTF 60 include an RF signal generator 62 and a controller 26. The AOTF is adapted to receive a multi-wavelength optical beam and provide an output optical signal of a selected wavelength in response to an RF signal provided by the RF signal generator 62. The selected optical wavelength is a function of the wavelength of the RF signal provided to the AOTF 60. The controller 26 provides a control signal that commands the RF signal generator to sequentially adjust the wavelength of the RF signal. Each RF signal provides a selected optical wavelength at the output of the AOTF. By serially adjusting the RF signal, the AOTF passes sequentially each optical wavelength 12 of the optical beam 14 to a detector element 20. The detector element then converts each optical wavelength to an electrical signal indicative of the amplitude of the power of each channel. The output signal can then be provided to a network controller that monitors the optical network or a dynamic optical amplifier.

As described hereinbefore, the loop status monitor 10 may also be used to monitor the "health" and status, such as power and signal-to-noise ratio of each channel, at various locations within the network.

Referring to FIG. 3, a block diagram of a high performance optical amplifier 24 with the required sophistication to handle reconfigurable networks provides a substantially uniform gain between each of the channels 12 of a dense wavelength division multiplexed optical beam 14 propagating through an optical fiber 30 of an optical network. The amplifier 24 includes an optical isolator 32 that permits the optical beam to pass through and prevent optical noise from propagating back through the optical fiber. The optical amplifier further includes a gain stage (G) 34, a gain flattening module (GFM) 36 and a gain equalization module (GEM) 28 connected in series. The optical beam is amplified initially by the gain stage 34, wherein the gain of each wavelength is not uniform. The amplified signal then passes through the gain flattening module 36 and the gain equalization module 28. The gain flattening module selectively attenuates each of the channels 12 to compensate for the fixed nonuniform gain characteristics of the gain stage 34 which will be described in greater detail hereinafter.

The gain equalization module 28 attenuates dynamically each of the channels in response to the control signals provided by the loop status monitor 10 to equalize the amplitude of the power of each of the channels 12. As described hereinbefore, the loop status monitor 10 generates corresponding control signals provided to the gain equalization module 28. Each of the control signals is representative of the degree of attenuation required to equalize the output signal of the amplifier.

Figure 4:
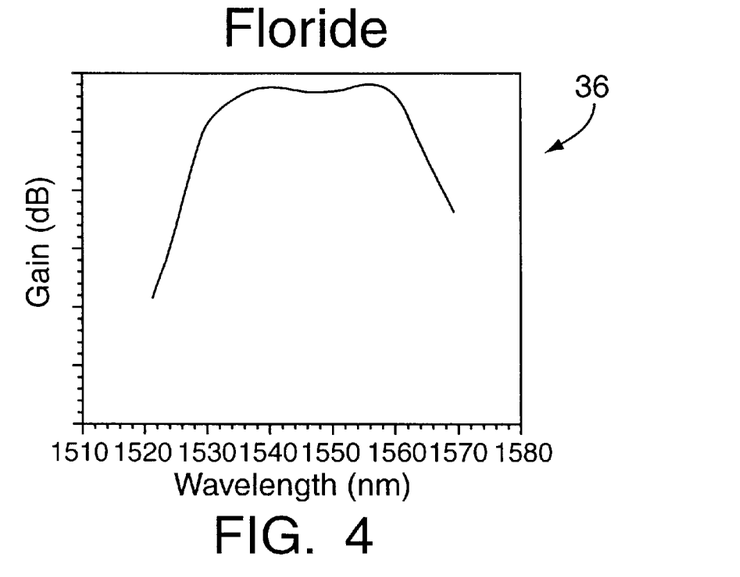
FIG. 4 is a graphical representation of the gain of an optical signal as a function of frequency for an erbium doped fluoride host glass fiber.
Figure 5:
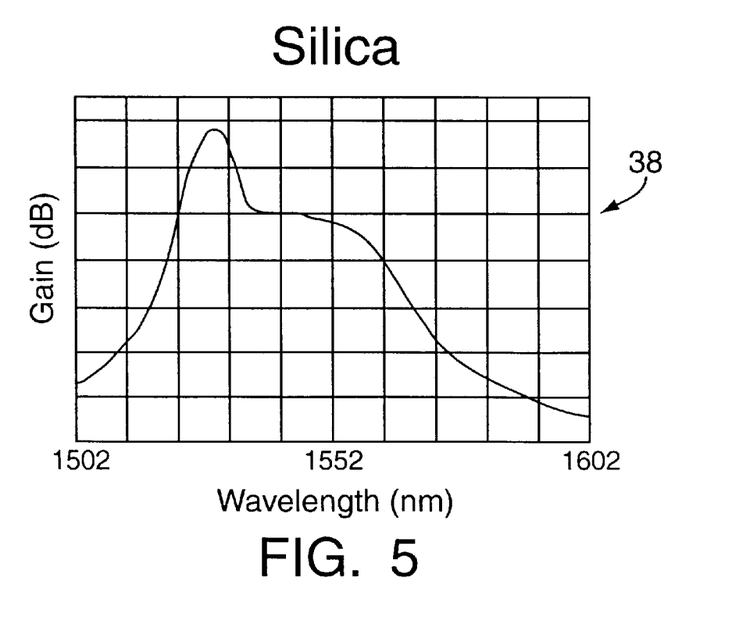
FIG. 5 is a graphical representation of the gain of an optical signal as a function of frequency for an erbium doped silica host glass fiber.

The gain stage 34 includes an optical fiber doped with a rare earth ion, such as erbium and praseodymium. The gain as a function of color, or gain spectrum, of these doped optical fibers is not uniform, and is also dependent on the input power, the spectrum of the optical beam and the composition of the fiber. In the case of erbium which provides a gain in the 1500 nm–1650 nm communications window, as shown in FIGS. 4 and 5, the gain can vary from 3 to 10 dB depending upon the glass composition of the fiber. FIG. 4 shows a curve 36 of the gain spectrum of an optical signal passing through an erbium doped fluoride host glass fiber. FIG. 5 shows a curve 38 of the gain spectrum of an optical signal passing through an erbium doped silica host glass fiber.

Figure 6:
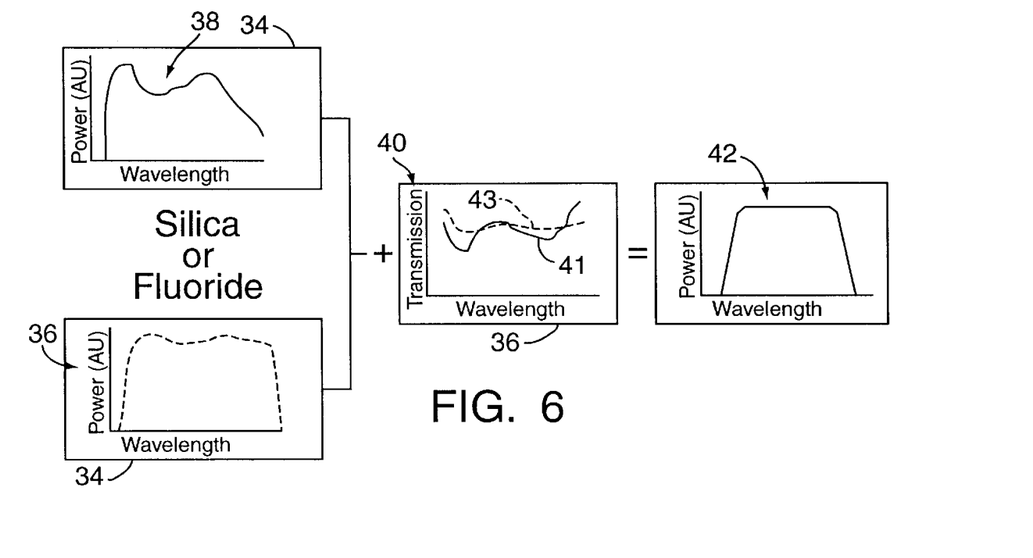
FIG. 6 is a graphical representation of the gain equalization using a gain flatting module of the type shown in FIG. 2.

Referring to FIG. 6, the gain flattening module 36 is adapted to compensate for the nominal variation of the gain spectrum of the gain stage 34. The gain flattening module flattens the gain or, in other words, selectively attenuates the gain spectrum so that the gain differential between each channel is preferably approximately 0.1–0.5 dB. The selective attenuation by the gain flattening module 12 may be provided by dielectric filters or fiber gratings, such as Long Period Gratings as shown in U.S. Pat. No. 5,430,817.

FIG. 6 includes the pair of curves 36,38 showing the amplified amplitude of the optical beam from gain stage 34 as a function of wavelength. The gain stage 34 of curve 36 comprises an erbium doped fluoride host glass fiber and the gain stage of curve 38 comprises an erbium doped silica host glass fiber. The attenuation of the amplified signal by the gain flattening module is graphically shown in curve 40. A solid curve 41 represents the attenuation of the input optical beam as a function of the wavelength for silica host glass fiber and a dotted curve 43 represents the attenuation of the input optical beam as a function of the wavelength for fluoride host glass fiber. The attenuation for each doped fiber is proportionally inverse to its respective gain spectrum 36,38. The resulting gain spectrum from each respective doped fiber and gain flattening module is substantially equal between each channel, as shown in curve 42.

Depending upon the spectral flatness of the passive fiber amplifier gain stage 20 (i.e. erbium doped fluoride host glass fiber), the passive gain flattening module 22 may not be required. This is true in the case where the gain equalization module 24 has sufficient bandwidth and dynamic range to provide both the gain flattening function and the gain equalization function simultaneously.

Referring again to FIG. 3, the flattened optical signal from the gain flattening module 36 then propagates to the gain equalization module 28 that substantially equalizes dynamically the amplitude of each channel 12. Dynamic gain equalization is necessary to compensate for the dynamic gain changes of the gain stage 34, such as gain tilt, gain ripple, hole burning, transient gain fluctuations, and any gain fluctuations from the gain flattening module. As described earlier, gain tilt is a function of the input power and spectra of the transmitted channels. As channels are added and subtracted from the optical beam, the input power changes and effectively "tilt" the gain of the amplifier in dependence of the wavelength of the channels. To compensate for gain tilt, the gain equalization module 28 selectively attenuates each respective channel in accordance to control signals provided by the loop status monitor 10.

As shown in FIG. 7, the gain equalization module 28 incorporates an array of wavelength tunable fiber Bragg gratings 50 to attenuate each channel 12. Each grating 50 is nominally aligned to a channel such that the transmission through the grating is varied by tuning the Bragg wavelength of the grating. The loop status monitor 10 measures the amplitude or power of each channel and provides a control signal back to each respective tunable grating 50 of the gain equalization module 28. Each grating 50 then attenuates each channel 12 in response to the corresponding control signal to vary the amplitude of each transmission through the grating, so that the amplitude of each channel is substantially equal at the amplifier's output terminal 52. One skilled in the art would recognize that other methods of tuning, such as electro-optic and acousto-optic tunable filters (AOTF), may be used to selectively attenuate the channels of the optical signal. A preferred equalization module 28 is described in greater detail in Applicants' co-pending application for "Dynamic Gain Equalization Module", attorney docket no. 4827-11, which is incorporated herein by reference.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. A loop status monitor for use in an optical network having a multi-wavelength optical beam with a plurality of component signals in which each component signal has an amplitude and a unique wavelength; said loop status monitor comprising:

an optical waveguide for receiving and substantially simultaneously demultiplexing said multi-wavelength optical beam into a plurality of component signals, said optical waveguide including one of ion implanted regions: dielectric filters: and bragg gratings; and a detector array having a plurality of photodetectors for receiving said component signal beams and for providing substantially simultaneously a corresponding electrical feedback signal for each of the component signals indicative of the magnitude of the output power of the component signal.

2. The loop status monitor, as set forth in claim 1, wherein the optical waveguide is generally planar silica.

3. The loop status monitor, as set forth in claim 2, wherein the optical waveguide includes optical grating to enhance isolation between the component signals.

4. A loop status monitor for use in an optical network having a multi-wavelength optical beam with a plurality of component signals in which each component signal has an amplitude and a unique wavelength: said loop status monitor comprising:

an optical waveguide for receiving and substantially simultaneously demultiplexing said multi-wavelength optical beam into a plurality of component signals:

a detector array having a plurality of photodetectors for receiving said component signal beams and for providing substantially simultaneously a corresponding electrical feedback signal for each of the component signals indicative of the magnitude of the output power of the component signal: and wherein the optical waveguide is butt coupled to said photodetectors.

5. A loop status monitor for use in an optical network having a multi-wavelength optical beam with a plurality of component signals in which each component signal has an amplitude and a unique wavelength: said loop status monitor comprising:

an optical waveguide for receiving and substantially simultaneously demultiplexing said multi-wavelength optical beam into a plurality of component signals:

a detector array having a plurality of photodetectors for receiving said component signal beams and for providing substantially simultaneously a corresponding electrical feedback signal for each of the component signals indicative of the magnitude of the output power of the component signal: and wherein the optical waveguide includes an acousto-optical tunable filter for receiving and providing a component signal of the multi-wavelength optical beam in response to a respective RF signal;

an RF signal generator for providing an RF signal to the acousto-optical tunable filter in response to a command signal; and a controller for generating a command signal to the RF signal generator for serially selecting RF signals that correspond to each component signal of the optical beam.

6. A loop status monitor assembly for use in an optical network having a multi-wavelength optical beam with a plurality of component signals in which each component signal has an amplitude and a unique wavelength; said loop status monitor comprising:

a optical waveguide for receiving and substantially simultaneously demultiplexing said multi-wavelength optical beam into a plurality of component signals;

a detector array having a plurality of photodetectors for receiving said component signal beams and for providing substantially simultaneously a corresponding electrical feedback signal for each of the component signals indicative of the magnitude of the output power of the component signal; and a controller for receiving the corresponding electrical feedback signal for each of the component signals and generating a corresponding control signal for each of the component signals to a gain equalization module to remove differences between the amplitudes of the output power of each of the component signals.

7. The loop status monitor assembly, as set forth in claim 6, wherein the optical waveguide is generally planar silica on silicon material.

8. The loop status monitor assembly, as set forth in claim 7, wherein the optical waveguide includes optical grating to enhance isolation between the component signals.

9. The loop status monitor assembly, as set forth in claim 6, wherein the optical waveguide is butt coupled to said photodetector elements.

10. The loop status monitor assembly, as set forth in claim 6, wherein the optical waveguide further comprises:

an acousto-optical tunable filter for receiving and providing a component signal of the multi-wavelength optical beam in response to a respective RF signal;

an RF signal generator for providing an RF signal to the acousto-optical tunable filter in response to a command signal; and a controller for generating a command signal to the RF signal generator for serially selecting RF signals that correspond to each component signal of the optical beam.

11. In an optical network having a multi-wavelength optical beam with a plurality of component signals in which each component signal has an amplitude and a unique wavelength, a method for use of generating a control signal for each of the component signals of the amount of attenuation required for equalizing each component signal; the method comprising the steps of:

(a) demultiplexing the multi-wavelength optical beam into the corresponding plurality of component signals;

(b) determining the magnitude of the power of each of the component signals;

(c) comparing the magnitude of the power of the component signals; and (d) generating a control signal for presentation to a gain equalization module to remove differences between the amplitudes of the power of each of the component signals.

* * * * *

(12) EX PARTE REEXAMINATION CERTIFICATE (4879th)
United States Patent
Ball (10) Number: US 5,915,052 C1
(45) Certificate Issued: Nov. 11, 2003

(54) LOOP STATUS MONITOR FOR DETERMINING THE AMPLITUDE OF THE SIGNAL COMPONENTS OF A MULTI-WAVELENGTH OPTICAL BEAM

(75) Inventor: Gary A. Ball, Simsbury, CT (US)

(73) Assignee: Uniphase Telecommunications Products, Inc., Bloomfield, CT (US)

Reexamination Request:
No. 90/005,713, Apr. 27, 2000

Reexamination Certificate for:
Patent No.: 5,915,052
Issued: Jun. 22, 1999
Appl. No.: 08/885,427
Filed: Jun. 30, 1997

(51) Int. Cl.[7] ............................................. G02B 6/28
(52) U.S. Cl. ...................... 385/24; 385/37; 385/14; 385/129; 385/130; 398/59; 398/79; 398/84
(58) Field of Search .................... 385/24, 37, 14, 385/129, 130; 359/124, 127, 130, 134; 398/59, 79, 84

(56) References Cited

U.S. PATENT DOCUMENTS 4,966,433 A * 10/1990 Blonder ........................ 385/49

5,268,976 A * 12/1993 Lerminiaux ................... 385/30

FOREIGN PATENT DOCUMENTS

| EP | 0 762 672 A2 | 3/1997 |
| EP | 0 762 672 | * 12/1997 |
| WO | WO 97/10658 | * 3/1997 |

* cited by examiner

*Primary Examiner*—Brian M. Healy (57) ABSTRACT

A loop status monitor for determining the magnitude of the power output of each signal component of a multi-wavelength optical beam includes a dense wavelength division demultiplexing arrayed waveguide and a detector array. The detector elements are butt-coupled to each respective output of the waveguide to reduce insertion loss and cost. The detector array is formed of planar silica material having a plurality of precision ion implanted regions that separate the optical beam into its respective signal components. The signal components are directed to a corresponding detector element of the detector array. Each detector element includes a photodiode that converts the optical beam to an electrical signal indicative of the amplitude of the power of the channel.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3 and 5–11 is confirmed.

Claims 1 and 4 are cancelled.

\* \* \* \* \*